Dec. 15, 1970 A. VACCARO 3,548,377

AUTOMATIC CHARACTER READING SYSTEM

Filed Oct. 6, 1966 2 Sheets-Sheet 1

INVENTOR.
Angelo Vaccaro
BY
Johnson and Kline
ATTORNEYS

AUTOMATIC CHARACTER READING SYSTEM

Filed Oct. 6, 1966

INVENTOR.
Angelo Vaccaro
BY
Johnson and Kline
ATTORNEYS

United States Patent Office 3,548,377

Patented Dec. 15, 1970

3,548,377

AUTOMATIC CHARACTER READING SYSTEM

Angelo Vaccaro, Port Washington, N.Y., assignor to Columbia Research Corporation, Glen Cove, N.Y., a corporation of New York Filed Oct. 6, 1966, Ser. No. 584,880
Int. Cl. G06k *9/18*
U.S. Cl. 340—146.3 4 Claims

ABSTRACT OF THE DISCLOSURE

A system for automatically reading visually recognizable characters of the type having vertical strokes and intervals of coded width and providing an electrical representation of the character. The system has a two state means that attains a one state for a predetermined time after the sensing of a stroke and then reverts to its other state. Within the predetermined time the one state is stored and also there is stored the other state if the two state means has not attained its one state again by the sensing of the next stroke by the use of two timing pulses, that occur at different intervals for every occurrence that the two state means attains its one state when an interval is present in the character.

In my copending application, Ser. No. 576,146 filed Aug. 30, 1966, there is disclosed a system for automatically reading specifically configured machine language ink characters and providing an electrical representation thereof. This set of machine language characters is known as the CMC7 code and is so configured as to be also humanly readable.

In the above-noted automatic reading system, there is a reading head beneath which the characters formed on a record medium, such as a check, are passed. The reading head has a small sensing slit that extends vertically across the character and produces a voltage wave representative of the character read by either optically scanning the character or sensing magnetic particles in the ink. The voltage wave may have a positive spike when the portion of the character beneath the reading head has a greater quantity of ink than a previous portion and a negative spike when a decrease in quantity is sensed. No changes in the quantity of ink produces a no-change condition in the voltage wave. Each character is differently configurated and thus has its own unique voltage wave. The system translates each voltage wave into an electrical representation and each character has its own representation which is different from other characters.

The characters of the code are formed according to specifications having prescribed dimensional tolerances and the system described in the above-noted application has been able to accurately read characters even when they substantially depart in configuration from the prescribed specification. However, as the system is responsive to the voltage wave which in turn is responsive to the quantity and disposition of the ink that forms the character, if the character is defective by substantially the quantity of ink not being present at each portion of the character where required or too much is present, then a voltage wave is created which while representative of the defective character so departs from the normal wave of the character that the system cannot accurately translate it to its proper electrical representation. The wave may include additional spikes caused by a large void, i.e. absence of ink or a spike may not be present if the ink becomes excessively spread. These character defects will be sensed by the reading head and if quite excessive will cause errors in the automatic reading of the character.

It is accordingly an object of the present invention to provide an automatic reading system for characters which is capable of accurately reading characters even when they have such substantial configuration defects that they would have heretofore not been able to have been accurately read.

Another object of the present invention is to provide a character reading system which is only responsive to selected portions of the character and is unresponsive to the remainder of the character so that defects which may be present in the latter portion are incapable of causing an error in reading.

A further object of the present invention is to provide an automatic character reading system which, even though capable of errorlessly reading characters that substantially depart from their approved specification, is extremely simple in construction, economical to manufacture, durable in use and may easily be incorporated into presently existing systems.

In my above-mentioned application, the system has included a two state means which is interconnected with a reading head. The reading head produces a voltage wave that is representative of the portion of the character being scanned and if an increase in the quantity of ink is sensed, a positive spike appears in the voltage wave and causes the two state means to have its 1 state. The 1 state remains until a negative spike appears by the reading head scanning a decrease in the quantity of ink and this negative spike causes the two state means to shift to its other or 0 state. In the absence of a positive or negative spike, i.e. a no-change condition, the two state means retains the state to which it was last shifted. By storing the state of the two state means while selected parts of the character are being read, an electrical representation unique to each character is thus effected. As the two state means is responsive to all the spikes in the voltage wave above a predetermined amplitude, spikes or lack of spikes caused by character defects, such as a large void or smearing, will also alter the state of the two state means and produce an inaccurate electrical representation of the character.

A feature of the present invention resides in limiting the responsiveness of the system to only selected portions of the character, not to all of it. This is achieved by making the two state means be responsive to only the selected portions of the voltage wave which are related to the part of the character being scanned and to be unreactive to the remaining portions. Only spikes occurring while the system is responsive are capable of altering the state of the two state means and spikes occurring in the remaining portions are totally disregarded. The selected portions comprise only a small fraction, approximately one fourth of the total voltage wave and as the wave is representative of the character, the system is accordingly only responsive to the same fraction of the total width of the character. Defects that occur in the remaining three fourths of the character and which would normally cause errors in reading are incapable of introducing the error into the present system.

The portions of each character to which the system is made responsive are preferably a plurality of widths of the character with each being a width that exists just prior to where a stroke is to appear and the leading edge of the stroke. The CMC7 code specifies that a character be formed with vertical strokes with a long or a short interval existing between strokes. The part of each character to which the system is unresponsive includes the remaining part of each stroke after its leading edge has been scanned and a length that is slightly less than the width of a short interval. The system is thus responsive to only a small trailing portion of each interval which as to a short interval may be about the latter one third thereof while as to a long interval, it may be substantially the latter half thereof. The end of an interval coincides with the leading edge of a stroke and thus the trailing end of each responsive portion is set to correspond with the leading edge of a stroke.

The system includes as its two state means, the type that has a stable state and an unstable state such as a monostable multivibrator or flip-flop. It is normally in its stable (0) state and upon receipt of a triggering pulse substantially instantaneously changes therefrom to its unstable (1) state. It maintains its 1 state for a predetermined length of time and then automatically shifts to its stable state. During its unstable state the system is unresponsive to changes in its state caused by spikes in the voltage wave. Additionally only positive spikes in the voltage wave are capable of functioning as a triggering pulse. The time during which the two state means is rendered unresponsive to the voltage wave is correlated to a definite width or portion of the character and is determined by the width of the character and its speed past the scanning head. In any event it is made to be less than the time required to scan a normal stroke and a short interval but more than the time required to scan just a stroke. As a CMC7 character has seven strokes, there will thus be seven widths of the character to which the system is responsive. The system while being only responsive while scanning these seven widths of the character is even more discriminating as to defects by only being responsive to positive spikes thereby not being responsive to negative spikes causing defects.

Other features and advantages will hereinafter appear.

Figure 1:
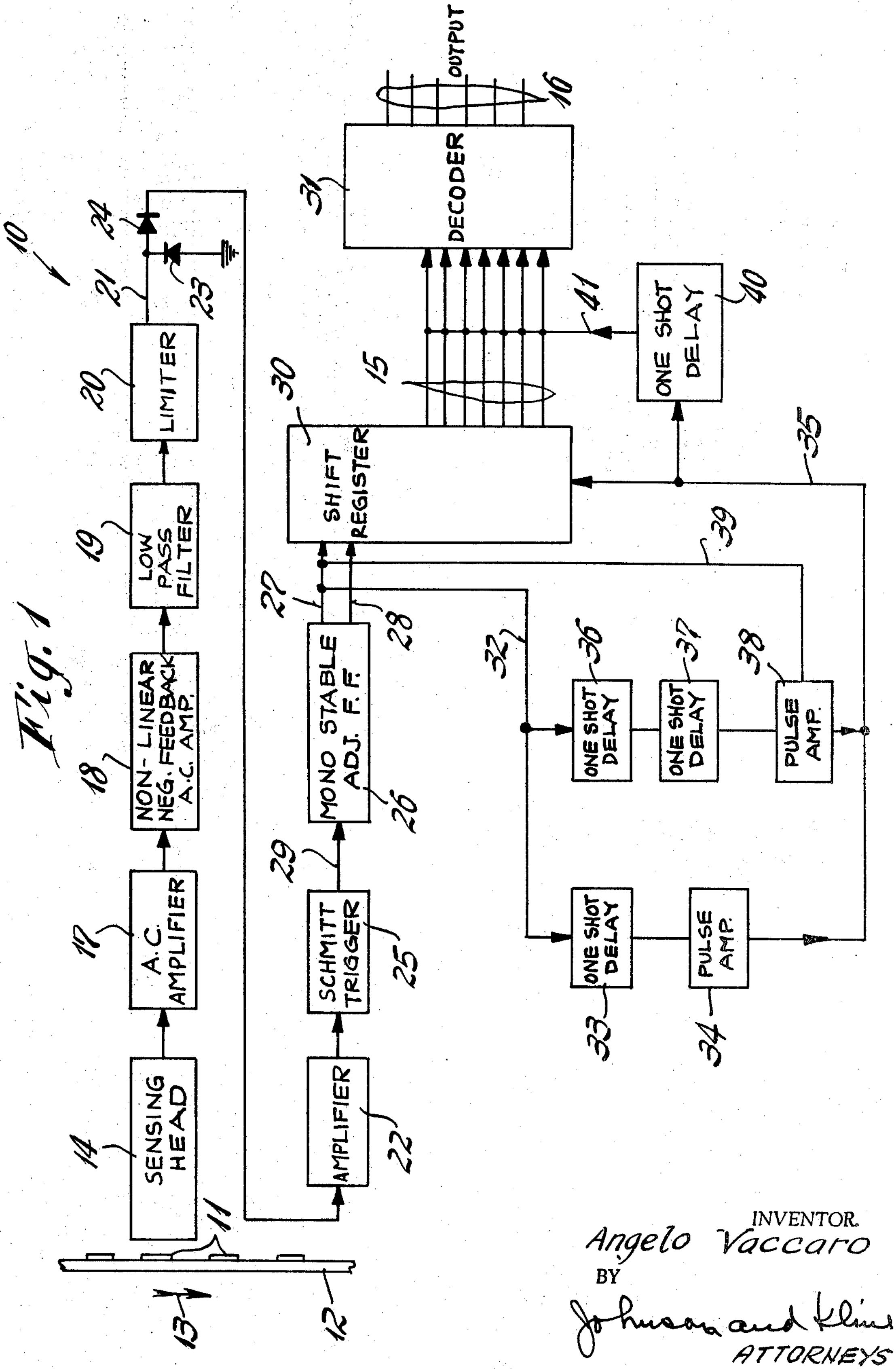
FIG. 1 is a block diagram of the automatic character reading system of the present invention.

Referring to the drawing, FIG. 1, the system is generally indicated by the reference numeral 10 and is employed to read characters 11 printed or otherwise formed with visually perceptible ink or a record sheet 12. The record sheet is moved in the direction of the arrow 13 beneath a sensing head 14. The system has a pair of output leads 15 and 16 on which an electrical representation of the character read appears by various leads having different voltage levels.

The present system and its manner of operation is substantially disclosed in my copending application Ser. No. 576,156 and reference is made thereto for a detailed disclosure. Generally, the system includes the sensing head 14 which may be an optical scanning head or a magnetic tape head and which produces a voltage wave as the character 11 is scanned by moving relative thereto. The wave is led to amplifiers 17 and 18 and filtered by a low pass filter 19. The amplified filtered wave is then introduced to a limiter 20 which limits each amplified spike to a common voltage value. The limiter has an output 21 on which both positive and negative spikes appear and which is connected to an amplifier 22. Only the positive spikes however are led to the amplifier 22 as negative spikes are grounded through a diode 23 while a diode 24 in the output 21 blocks negative voltages. The amplifier 22 controls operation of a Schmitt trigger 25 which in turn supplies a pulse to the trigger point of a monostable multivibrator or flip-flop 26 that has an adjustable unstable time.

The two state means, flip-flop 26, has a pair of output sense leads 27 and 28 and the stable or 0 state thereof has the lead 27 to be at ground and the lead 28 to be of a negative potential. For the unstable state, the reverse condition exists with the lead 28 being at ground and the lead 27 having a negative potential. A lead 29 from the output of the Schmitt trigger 25 is connected to the trigger point of the flip-flop 26. Upon receipt of a triggering spike on the lead 29 caused only by a positive spike in the voltage wave, the flip-flop 26 is caused to assume its unstable or 1 state and to retain this state until an adjustable predetermined time has elapsed when it will automatically return to its stable or 0 state. For each spike on the lead 29, when the flip-flop is in the 0 state, the flip-flop 26 substantially simultaneously shifts to its 1 state with receipt of the spike and it will retain this 1 state for a set period of time. At other than the set period of time it will be in its 0 or stable state. During its unstable state, spikes occuring on its trigger point will have no effect on its state or its set time for remaining in its unstable state.

The output or sense points of the two state means 26 are connected by the leads 27 and 28 to the entrance stage of a plural stage shift register 30. Upon actuation of the shift register by a trigger pulse thereto, the entrance state thereof is made to assume the state of the two state means 26 and the state of the intermediate stages successively advanced one stage. The output of the shift register consists of voltage levels on the leads 15 with the leads being connected to a plurality of intermediate states of the shift register 30 as disclosed in my above-noted application.

The electrical representation on the leads 15 is in a unique code which may be directly used in subsequent information processing equipment or if such equipment is only capable of accepting electrical representations of characters in approved binary code or decimal code, the output leads 15 may be connected to a decoder 31. The decoder 31 translates the unique code into conventional code such as binary or decimal with the output thereof appearing on the leads 16.

Interconnected with the lead 27 by a lead 32 is one-shot delay 33 which serves to supply a trigger pulse to a pulse amplifier 34, the latter amplifying said trigger pulse and applying the same through the lead 35 to the shift register 30. Also connected to the lead 32 is a one-shot delay 36 which serves to supply an additional trigger pulse to another one-shot delay 37, the latter supplying the trigger pulse after a determined delay to a pulse amplifier 38. The pulse amplifier 38 has a lead 39 connected to the lead 27. When the two state means 26 is in the 1 state, the lead 27 has a negative voltage thereon which inhibits the pulse amplifier 38 from amplifying the pulse received from the one-shot delay 37. However, when the two state means 26 is in the 0 state, the pulse amplifier 38 is not inhibited by a negative voltage and it will amplify the trigger pulse from the one-shot delay 37 and supply it to effect triggering of the shift register 30. Each trigger pulse on the lead 35 will accordingly cause the shift register to store the state of the two state means at the time the trigger pulse is received and to advance the various states of the intermediate stages one subsequent stage.

The one-shot delay 33 is preferably timed to supply a trigger pulse at the time when approximately the mid-stroke of each stroke of a CMC7 character is beneath the sensing head while the one-shot delays 36 and 37 and the pulse amplifier 38 serve to supply a trigger pulse only when the latter half of a long interval of a character is beneath the sensing head.

A one-shot delay 40 is also connected to the lead 35 to receive trigger pulses thereon and has a lead 41 connected to each of the output leads 15. The one-shot delay 40 through the lead 41 provides a voltage which inhibits the passing of information on the leads 15 until a predetermined time has elapsed when the voltage is removed to enable passage of the electrical representation of the stages of the shift register on the leads 15. The predetermined time of the delay 40 is set to be the period required for at least a whole character to pass beneath the sensing head but less than a whole character and a gap between characters and it thus prevents removal of the information from the shift register until the whole character has been scanned and the various states of the two state means stored. The first trigger pulse of a subsequent character serves to activate the delay to cause it to again initiate the predetermined time for supplying the blocking voltage.

Figures 2, 3, 4, 5:
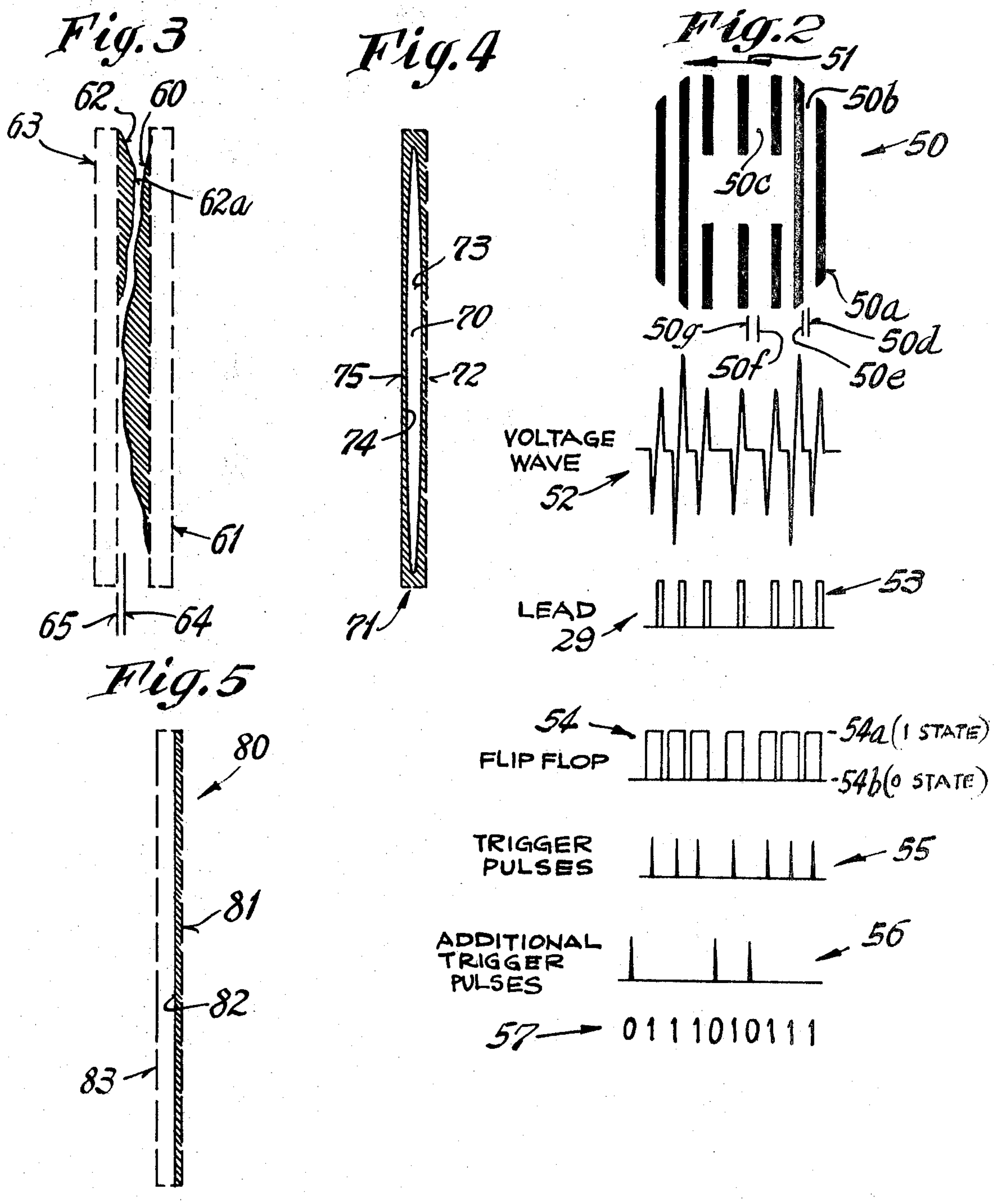
FIG. 2 is a representation of the CMC7 character 0 together with representations of conditions that occur in the system during and after the reading of the character.
FIG. 3 is a sketch of an enlarged portion of a character showing one kind of defect, specifically a blur or smearing of the edges of a stroke which may occur in CMC7 characters.
FIG. 4 is a sketch of an enlarged portion of a character showing another kind of defect, specifically a void in a stroke which may occur in CMC7 characters.
FIG. 5 is a sketch of an enlarged portion of a character showing still another kind of defect that may occur, specifically a stroke of extremely short width.

Referring to FIG. 2, there is shown the CMC7 character 0 and vertically aligned therewith various conditions that occur in the system 10 while the character is being read and after the reading thereof. The character is indicated by the reference numeral 50 and is read from right to left by the sensing head as indicated by the arrow 51 and thus time in effect moves leftwardly with the left hand parts of the various conditions occurring after the adjacent right hand parts. The voltage wave produced by the character 0 is indicated by the reference numeral 52 and includes positive and negative spikes. All positive spikes having sufficient amplitude appear as spikes (indicated by the reference numeral 53) on the lead 29 to cause activation of the flip-flop 26 to its 1 state. The state of the flip-flop is shown in depictation 54 in which portions horizontally aligned with the line 54*a* indicate that timewise the flip-flop is in the 1 state while portions aligned with the line 54*b* indicate that the flip-flop is in the 0 state.

Trigger pulses applied to the shift register 30 from the pulse amplifier 34 are shown in depictation 55 and additional trigger pulses that are supplied to the shift register by the pulse amplifier 38 are shown in depictation 56. Accordingly the shift register will store the states 57 in the shift register, reading the states from left to right, from its last stage to its entrance stage. If the character is formed to substantially comply with the specifications and produce its representative voltage wave, then the character by the system of the present invention or the system disclosed in the above-noted copending application will errorlessly automatically read the character in the manner above noted.

In FIG. 2, the various conditions mentioned are vertically aligned with the part of the character that is being scanned by the sensing head when the condition occurs. The relative positioning of the conditions are thus correlated to the part of the character being scanned when the condition occurs.

It will be appreciated from the depictation 54 of the state of the flip-flop 26 that it is in its 1 or unstable state for approximately three-fourths of the time to read a character. It assumes this state substantially simultaneously with the scanning of the leading edge of a stroke 50*a* of the character and maintains this state for at least the time required to scan the stroke but less than the time required to scan the stroke and a following short interval 50*b*. The reaction time of the components of the system and the speed of the character beneath the sensing head are factors which are involved in selecting the unstable time and when it will automatically shift from the unstable state to the stable state. One setting that has been found satisfactory is for the unstable state of the two state means to exist for the length of time required to scan one stroke and three-quarters of a short interval. For a stroke followed by a long interval 50*c*, the time is of the same length so that the shift to the stable state occurs at about the midpoint of the long interval. Thus the stable state exists for substantially the latter half of the long interval, thus enabling the 0 state of the flip-flop to be stored.

As a specific example, in CMC7 characters having a stroke width of .15 mm., a short interval width of .30 mm. and a long interval width of .50 mm. and moving at .01 mm. per millisecond, the two state means will have an unstable state for the length of time for one stroke (15 milliseconds) and ¾ of a short interval (22½ milliseconds) to pass beneath the sensing head for a total time of 37½ milliseconds. During a long interval, the total time is the same, so that the two state means is in its stable state for the difference, 27½ milliseconds, which is substantially the latter half of the long interval.

In FIG. 2, the width between the lines 50*d* and 50*e* indicates for a short interval 50*b* the part of the character being scanned while the two state means is in its stable state. For a long interval 50*c*, the lines 50*f* and 50*g* indicate the portion of the character being scanned while the two state means is in its stable, responsive state. Lines 50*e* and 50*g* are aligned with the leading edge of their corresponding stroke. It will thus be understood that when the leading edge 50*a* of the stroke is scanned the flip-flop shifts to its 1 state and remains in this state until the portion of the character aligned with the line 50*d* is scanned. Thus the flip-flop automatically assumes its stable state until the leading edge of the next stroke is sensed. It functions in such a manner for each stroke.

FIG. 3 is a sketch showing a trailing edge 60 of a stroke 61 and a leading edge 62 of an adjacent stroke 63. The strokes may be separated by a long or short interval but the adjacent edges of the strokes are blurred and/or ragged so that there is no definite outline of the interval. In the present system the stable state occurs with the portion of the character being read that is vertically aligned with the line 64. From the line 64 leftwardly to a line 65 aligned generally with the leading edge of the stroke 63, the flip-flop 26 is in its stable state and will be changed to its unstable state when the part of the leading edge aligned with the line 65 is scanned to produce a positive spike.

In the present system, the blurring does not introduce error as the system only requires that there be a sufficient decrease in the quantity of ink to produce a positive spike having an amplitude capable of actuating the flip-flop 26 and that the spike occur leftwardly of the line 64. In other systems, the defect shown in FIG. 3 could introduce error by the edge 60 not producing a state changing negative spike, the hump 62*a* of the edge 62 preventing a state changing positive spike, etc. As most defects in CMC7 characters are caused by the smearing or blurring of the strokes into the intervals, it will be appreciated that most defects which would in other systems introduce error, will not introduce error in the present system.

Shown in FIG. 4, is another form of commonly occurring defect which consists of a void 70 in the middle of a stroke 71. Normally the leading edge 72 of the stroke would create a positive spike, the edge 73 of the void a negative spike, the edge 74 a positive spike and the edge 75 a negative spike. The spikes caused by the edges 73 and 74 could cause erroneous reading of the character. This defect however does not introduce error in the present system because the positive spike caused by the edge 72 changes the state of the flip-flop 26 to its unstable state for at least a length of time greater than is required to scan the stroke and during this time, the system is unresponsive to spikes caused by the edges 73, 74 and 75.

Another type of defect is shown in FIG. 5 and consists of a stroke 80 having a width less than half its normal width. The edges 81 and 82 would normally cause operation of the two state means so that the two state means would be in its 0 state when the mid-portion of the stroke is being scanned. As a trigger pulse is applied at substantially the midpoint of the stroke, a 0 state instead of the 1 state would be stored, thereby introducing error. In the present system such a defect will not cause error as the flip-flop 26 will be in its unstable or 1 state from the time that the edge 81 is scanned until a least after the scanning of the part of the character where the trailing edge 83 would occur.

In the above consideration of the defects in a character which the present system can tolerate and still read the character errorlessly, the leading edge of a stroke has been shown as occurring where it is called for by the specifications of the character. It however may deviate therefrom to occur just prior to the time when the stable state of the flip-flop 26 is achieved as limited by the time constants of the circuit or deviate in the other direction to just prior to the scanning of the midpoint of a normal stroke. Thus though the system is dependent on reading the initial edge of each stroke, it does not depend on a preciseness of location of the leading edge but permits relatively wide latitude in the location of the edge.

While the specifically disclosed system has the unstable state remain for a duration required to scan a stroke and three fourths of a short interval, it will be understood that the duration may be different therefrom. It has been found desirable to maintain the unstable state for as long as possible depending on factors such as the speed of response of the components in the circuit and the speed of the character past the sensing head, in order to increase the part of the character to which the system is unresponsive.

It will accordingly be appreciated that there has been disclosed a system for automatically reading characters and providing an electrical representation of the character read. Each character will provide a representation especial to it with the representation consisting of a binary code unique to the present system. While all the character is scanned as it is passed beneath a sensing head, the system is made to be responsive to only a small portion of the whole character with the system being unresponsive to the remaining portion. The remaining portion which constitutes perhaps three fourths of the character, accordingly may have substantial defects in the forming of the character but as they are incapable of effecting the system, the defects will not introduce errors in the reading. Moreover, the small actuating portion of the character may deviate substantially from the specifications of the character and still be read errorlessly by the present system. The system, while disclosed specifically for reading CMC7 code characters, may also be employed to read other characters or depictations which are composed of strokes and different length intervals.

Variations and modifications may be made within the scope of the claims and portions of the improvements may be used without others.

I claim:

1. An automatic character recognition system for reading characters formed with strokes separated by long and short length intervals and supplying an electrical representation of the character read comprising sensing means for producing a voltage wave representative of the character when the character is relatively passed therebeneath with the voltage wave having at least one condition caused by the sensing of a stroke and another condition caused by the sensing of an interval, two state means having an unstable state and a stable state, means interconnecting the sensing means to the two state means to cause the two state means to assume its unstable state upon the sensing of a stroke as indicated by the beginning of a one condition and for retaining said unstable state for a predetermined time after which it automatically returns to its stable state, said predetermined time being at least as long as the time required for a stroke and one half a short interval to pass beneath the sensing means but less than the time required for the passing of a stroke and a short interval beneath the sensing means and with the two state means being unresponsive to the conditions of the sensing means during this predetermined time, storage means for storing the instantaneous state of the two state means upon receipt of a trigger pulse, means connected to the two state means for providing a plurality of trigger pulses to the storage means with a trigger pulse being supplied shortly after the two state means attains its unstable state and for supplying an additional trigger pulse for each attaining of the unstable state of the two state means and means for inhibiting the supplying of additional trigger pulses to the storage means except when the two state means is in its stable state.

2. The invention as defined in claim 1 in which the predetermined time expires after a time that is less than the time for a stroke and substantially one half a long interval to pass beneath the sensing head and in which the system includes means for preventing the other condition of the voltage wave from effecting operation of the two state means.

3. An automatic character recognition system for reading characters formed with ink portions occurring at selected spaced widths of the character and lesser ink portions between said ink portions with the width of an ink portion and an adjacent lesser ink portion being either narrow or wide comprising sensing means for providing a signal representative of a change in the quantity of ink in the character as it is relatively moved beneath the sensing means, two state means having a first state and a second state with the two state means shifting to one of its states and retaining said one state for a predetermined time upon said shifting and after said time automatically returning to its other state, means interconnecting the sensing means with the two state means to cause actuation of the two state means upon receipt of the signal to change it to its one state, storage means connected to the two state means for storing the state of the two state means at the time of receiving each trigger pulse and means for supplying a plurality of trigger pulses to the storage means with some pulses occurring a determined time after actuation of the two state means but less than the predetermined time and some other pulses occurring after the predetermined time, said predetermined time being more than the time for an ink portion and one half an adjacent lesser ink portion to move beneath the reading head but less than the time for an ink portion and an adjacent lesser ink portion to move beneath the reading head.

4. The invention as defined in claim 3 in which the determined time for the pulses is less than the time for an ink portion to pass beneath the reading head.

References Cited

UNITED STATES PATENTS

| | | | |
|---|---|---|---|
| 2,961,649 | 11/1960 | Eldredge et al. | 340—146.3 |
| 3,113,298 | 12/1963 | Poland et al. | 340—146.3 |
| 3,286,233 | 11/1966 | Lesueur | 340—146.3 |
| 3,283,303 | 11/1966 | Cerf | 340—146.3 |
| 3,303,469 | 2/1967 | Perotto | 340—146.3 |
| 3,309,667 | 3/1967 | Feissel et al. | 340—146.3 |
| 3,354,432 | 11/1967 | Lamb | 340—146.3 |
| 3,461,427 | 8/1969 | Parker | 340—146.3 |

T. A. ROBINSON, Primary Examiner

PO-1050
(5/69)

UNITED STATES PATENT OFFICE
CERTIFICATE OF CORRECTION

Patent No. 3,548,377 Dated December 15,1970

Inventor(s) Angelo Vaccaro

It is certified that error appears in the above-identified patent and that said Letters Patent are hereby corrected as shown below:

In column 1, line 4, the assignee's name should read "Columbia Controls Research Corporation".

Column 1, line 26,"576,146" should read "576,156".

Column 3, line 50, "or" should read "on".

Signed and sealed this 6th day of April 1971.

(SEAL)
Attest:

EDWARD M.FLETCHER,JR.
Attesting Officer

WILLIAM E. SCHUYLER, JR
Commissioner of Patents